(12) United States Patent  
Konanka et al.

(10) Patent No.: US 8,194,890 B2  
(45) Date of Patent: Jun. 5, 2012

(54) DETECTING AND PROCESSING BUTTON PRESS EVENTS FOR PERFORMING ELECTRONIC DEVICE OPERATIONS

(75) Inventors: Kenji Konanka, Los Gatos, CA (US); Timothy Hannon, Campbell, CA (US); Matthew Rogers, Los Gatos, CA (US); Rishabh Bhargava, San Jose, CA (US)

(73) Assignee: Apple Inc., Cupertino, CA (US)

( * ) Notice: Subject to any disclaimer, the term of this patent is extended or adjusted under 35 U.S.C. 154(b) by 402 days.

(21) Appl. No.: 12/477,679

(22) Filed: Jun. 3, 2009

(65) Prior Publication Data

US 2010/0232625 A1    Sep. 16, 2010

Related U.S. Application Data

(60) Provisional application No. 61/159,074, filed on Mar. 10, 2009.

(51) Int. Cl.  
*H03G 3/00* (2006.01)  
*G01F 1/26* (2006.01)

(52) U.S. Cl. .......................... 381/108; 713/300; 713/310  
(58) Field of Classification Search .................... 381/57, 381/106–108; 713/300, 310; 257/254, 416  
See application file for complete search history.

(56) References Cited

U.S. PATENT DOCUMENTS

| | | | |
|---|---|---|---|
| 7,536,565 B2 * | 5/2009 | Girish et al. ................... | 713/300 |
| 7,627,128 B2 | 12/2009 | Sander et al. | |
| 2010/0064061 A1 * | 3/2010 | Warren et al. ...................... | 710/5 |
| 2010/0094880 A1 * | 4/2010 | Rogers et al. ................. | 707/752 |
| 2010/0198375 A1 * | 8/2010 | Rottler et al. .................... | 700/94 |

* cited by examiner

*Primary Examiner* — Calvin Lee  
(74) *Attorney, Agent, or Firm* — Kramer Levin Naftalis & Frankel LLP

(57) ABSTRACT

This is directed to processing inputs received from an input mechanism to control media playback operations and volume. The input mechanism can include a first button providing inputs by shorting an electrical circuit, and a second button providing inputs by changing the resistance or tone detected or received by a processor. To process inputs, a processor can first detect and process short events from the first button, and subsequently process button events from the second button.

20 Claims, 3 Drawing Sheets

DETECTING AND PROCESSING BUTTON PRESS EVENTS FOR PERFORMING ELECTRONIC DEVICE OPERATIONS

PRIORITY CLAIM

This application claims priority to commonly assigned U.S. Provisional Patent Application No. 61/159,074, filed Mar. 10, 2009, which is incorporated by reference herein in its entirety.

BACKGROUND OF THE INVENTION

This is directed to an algorithm for detecting and processing button press events of an electronic device input mechanism.

Users can interact with electronic devices using different interfaces. In some embodiments, a user can interact with a device using a series of buttons, for example embedded within the electronic device, or coupled to the device using an accessory (e.g., buttons connected to a wired headset coupled to an audio jack of the electronic device). In some cases, the number of buttons provided can exceed the number of electric paths connected to an electronic device interface. For example, an electronic device can be coupled to a multi-button accessory that provides signals to the device using an audio jack. Because the audio jack can have two audio channels, a ground channel, and a microphone channel, and the audio channels typically cannot be interfered with (e.g., shorted to provide an instruction) without adversely affecting the quality of audio detected, the accessory and electronic device can require specialized circuitry for providing different signals using a single channel. One approach can include, for example, using a resistor network of varying resistance, or a component for outputting different audio tones based on a detected input (e.g., which of several buttons were pressed). Instead or in addition, the accessory can include a button that provides inputs to the device by shorting one of the audio jack channels (e.g., the microphone channel).

To determine which electronic device operation to perform in response to detecting an input, the electronic device can process inputs received from the multi-button accessory device to prioritize different detected inputs and ensure that all of the requested device operations are performed.

SUMMARY OF THE INVENTION

This is directed to systems and methods for processing inputs detected using an input mechanism for which a first input can hide a second input.

The electronic device can detect inputs from an input mechanism coupled to the electronic device. The input mechanism can include several buttons for providing inputs, including a first button providing an electrical short detectable by the electronic device, and secondary buttons providing a change in detected resistance or an audible tone detectable by appropriate circuitry of the electronic device. For example, the input mechanism can include a mechanism having some or all of the attributes of those described in commonly assigned U.S. Pat. No. 7,627,128, issued Dec. 1, 2009, which is incorporated by reference herein in its entirety.

The electronic device can include circuitry operative to detect inputs provide by the input mechanism. In some embodiments, the electronic device can initially determine whether an appropriate input mechanism is coupled to the device. For example, the electronic device can determine whether the input mechanism includes the necessary circuitry for providing the different types of inputs to the device. Once the electronic device has verified that the appropriate input mechanism is coupled, the device can detect short events provided by the first button, and button events provided by the secondary buttons.

The electronic device can first determine whether the primary button was pressed (e.g., whether a short event was detected) and count the number of short events. The electronic device can then perform an operation associated with the detected number of short events. The electronic device can include a timeout for limiting the duration for which short events can be provided. The electronic device can instead or in addition determine whether a secondary button was pressed (e.g., whether a tone or resistor value was detected). If the secondary button is associated with volume control, the electronic device can initially change the volume control, and store the current time for a volume timer. If the electronic device determines that a secondary button is pressed for longer than a particular duration (e.g., determined from the current time and volume timer), the electronic device can ramp the volume (e.g., up or down based on the pressed secondary button).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
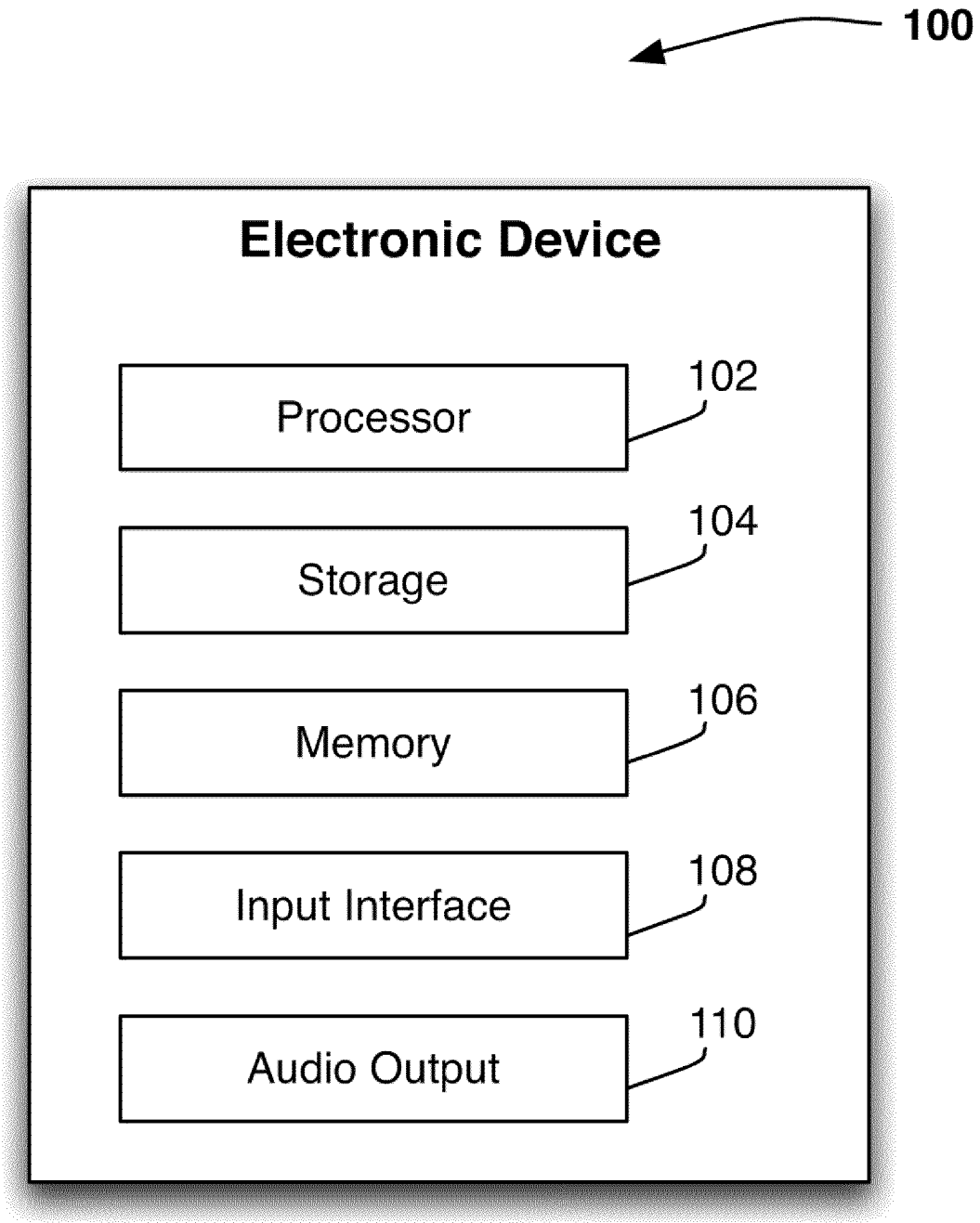
FIG. 1 is a schematic view of an electronic device in accordance with one embodiment of the invention.

FIG. 1 is a schematic view of an electronic device in accordance with one embodiment of the invention. Electronic device 100 may include processor 102, storage 104, memory 106, input interface 108, and audio output 110. In some embodiments, one or more of electronic device components 100 may be combined or omitted (e.g., combine storage 104 and memory 106). In some embodiments, electronic device 100 may include other components not combined or included in those shown in FIG. 1 (e.g., a power supply or a bus), or several instances of the components shown in FIG. 1. For the sake of simplicity, only one of each of the components is shown in FIG. 1.

Processor 102 may include any processing circuitry operative to control the operations and performance of electronic device 100. For example, processor 100 may be used to run operating system applications, firmware applications, media playback applications, media editing applications, or any other application. In some embodiments, a processor may drive a display and process inputs received from a user interface.

Storage 104 may include, for example, one or more storage mediums including a hard-drive, solid state drive, flash memory, permanent memory such as ROM, any other suitable type of storage component, or any combination thereof. Storage 104 may store, for example, media data (e.g., music and video files), application data (e.g., for implementing functions on device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that may enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that may be stored in storage 104. In some embodiments, memory 106 and storage 104 may be combined as a single storage medium.

Input interface 108 may include any suitable interface for providing inputs to input/output circuitry of the electronic device. Input interface 108 may include any suitable input interface, such as for example, a button, keypad, dial, a click wheel, a touch pad, or any combination thereof. The input interface can detect user inputs using at least one sensing element, such as a mechanical sensor, resistive sensor, capacitive sensor, a multi-touch capacitive sensor, or any other suitable type of sensing element. In some embodiments, to minimize the overall dimensions of electronic device 100, input interface 108 can include a limited number (e.g., one) of sensing elements operative to detect inputs to the device. Any suitable event sensed by the sensing element can be used to define an input. For example, an input can be detected when a sensor detects an initial event interaction from the user (e.g., the user presses a button). As another example, an input can be detected when a sensor detects the end of an event or interaction from a user (e.g., the user releases a button). As still another example, an input can be detected both when an interaction is initially detected and when the same interaction ends (e.g., a first input when the user presses and holds the button, for example to enter an audio menu mode, and a second input when the user releases the button, for example to select an option from the audio menu).

To further reduce the size of the device, the one or more sensing elements can be remotely coupled to the device, for example wirelessly or via a wire or cable (e.g., a button embedded in a headphone wire). In some embodiments, the input interface can include an assembly having two volume control buttons and a single playback and menu control button placed between the two volume buttons, where the buttons each include a single mechanical sensing element and the assembly is positioned on a headphone wire. In such embodiments, no input interface can be located on the electronic device (e.g., or only a hold switch). The playback and menu control button can provide signals to the electronic device by shorting a conductive path between the input interface and the electronic device, and the electronic device can detect inputs provided by the volume control buttons by measuring the resistance of a received signal or based on the tone of an audio signal provided to the electronic device.

In some embodiments, the input interface can include several sensing elements for controlling media playback, enabling a menu mode, and providing menu navigation and selection instructions. For example, the input interface can include a limited number of sensing elements for controlling the various device operations. In one implementation, the electronic device can include several buttons, each associated with mechanical sensing elements (e.g., dome switches), where different combinations of the several buttons (e.g., two or three buttons) can be used to control media playback, access an audio menu, select audio menu options, and navigate the audio menu. For example, a first button can be used to control media playback, access the audio menu, and select audio menu options, and a second and third button can be used to navigate between options and sub-options within the audio menu.

Audio output 110 may include one or more speakers (e.g., mono or stereo speakers) built into electronic device 100, or an audio connector (e.g., an audio jack or an appropriate Bluetooth connection) operative to be coupled to an audio output mechanism. For example, audio output 110 may be operative to provide audio data using a wired or wireless connection to a headset, headphones or earbuds. In some embodiments, input interface 108 can be incorporated in a portion of audio output 110 (e.g., embedded in the headphone wire).

One or more of input interface 108 and audio output 110 may be coupled to input/output circuitry. The input/output circuitry may be operative to convert (and encode/decode, if necessary) analog signals and other signals into digital data. In some embodiments, the input/output circuitry can also convert digital data into any other type of signal, and vice-versa. For example, the input/output circuitry may receive and convert physical contact inputs (e.g., from a touch pad), physical movements (e.g., from a mouse or sensor), analog audio signals (e.g., from a microphone), or any other input. The digital data can be provided to and received from processor 102, storage 104, memory 106, or any other component of electronic device 100. In some embodiments, several instances of the input/output circuitry can be included in electronic device 100.

In some embodiments, electronic device 100 may include a bus operative to provide a data transfer path for transferring data to, from, or between control processor 102, storage 104, memory 106, input interface 108, sensor 110, and any other component included in the electronic device. Such other components can include, for example, communications circuitry, positioning circuitry, motion detection circuitry, or any other suitable component. In some embodiments, communications circuitry can be used to connect the electronic device to a host device from which media such as audio, metadata related to the audio, and playlists or other information for managing the received audio.

Figure 2:
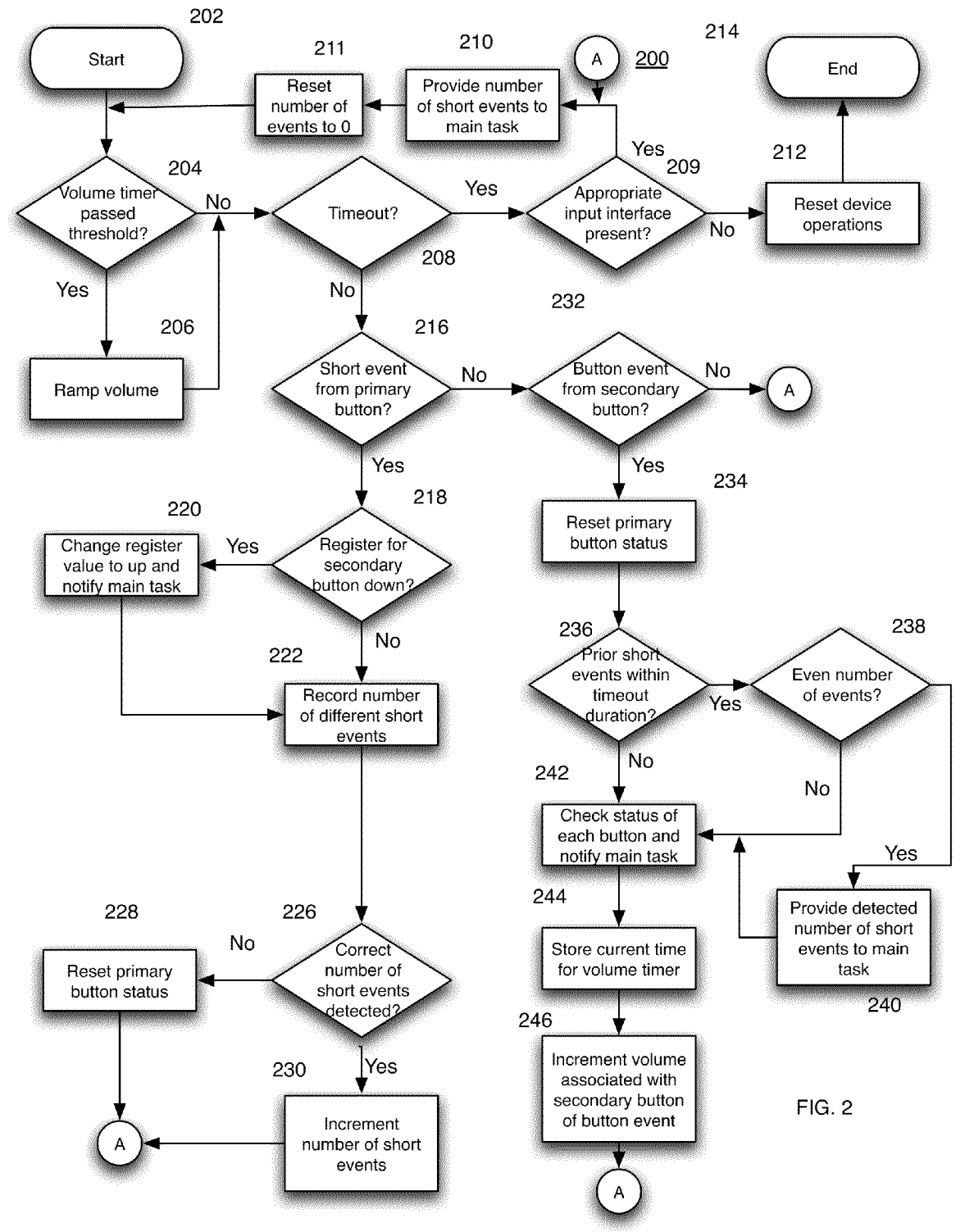
FIG. 2 is a flowchart of an illustrative process for processing received inputs in accordance with one embodiment of the invention.

The electronic device can process signals received from the input interface using any suitable approach. FIG. 2 is a flowchart of an illustrative process for processing received inputs in accordance with one embodiment of the invention. Process 200 can begin at step 202. At step 204, the electronic device can determine whether a volume timer has passed a threshold. For example, the electronic device can determine whether a secondary button associated with a volume control is in a pressed state (e.g., secondary button is down) and has been down for a duration that exceeded a predetermined value (e.g., a value in the range of 200 ms to 800 ms, such as 500 ms). The electronic device can determine the duration for which a secondary button was pressed by comparing the current time with a time stamp stored when the secondary button press was initially detected. If the electronic device determines that the volume timer has passed a threshold, process 200 can move to step 206. At step 206, the electronic device can ramp the volume. For example, the electronic device can ramp the volume up or down based on the particular secondary button that is pressed. Process 200 can then move to step 208.

If, at step 204, the electronic device instead determines that the volume timer has not passed the threshold, process 200 can move to step 208. At step 208, the electronic device can determine whether the process has timed out. For example, the electronic device can determine whether no inputs were provided during the duration of a timeout. The timeout can have any suitable duration, including for example a duration in the range of 100 ms to 1000 ms, such as 300 ms. The duration can be selected based on the available number and combinations of an input that a user can provide (e.g., the timeout can be selected to ensure that a user will have time to provide four consecutive button presses, but reduce the chance that a user provide five or more consecutive button presses). If the electronic device determines that the timeout has lapsed, process 200 can move to step 209. At step 209 the electronic device can determine whether an appropriate input interface is present. For example, the electronic device can determine whether an input interface having secondary buttons, or circuitry for providing inputs associated with secondary buttons is provided. If the electronic device determines that no appropriate input interface is present, process 200 can move to step 212. At step 212, the electronic device can reset the electronic device operation settings. For example, the electronic device can reset the registers indicating the status of the primary and secondary buttons. As another example, the electronic device can cease performing a playback operation (e.g., stop rewinding or playing back media). Process 200 can then end at step 214.

If, at step 209, the electronic device instead determines that an appropriate interface is present, process 200 can move to step 210. At step 210, the electronic device can provide a detected number of short events to the main task to perform the electronic device operation associated with the detected number of short events (e.g., playback operations or menu instructions, for example as described in commonly assigned U.S. Patent Application Publication No. 2010/0198375, published Aug. 5, 2010, which is incorporated by reference herein in its entirety). In some embodiments, the electronic device can provide the number of short events detected, or the particular operation to perform, to a queue processed by the user interface process of the device. The detected number of short events can be stored in a register, for example at step 230 described below. At step 211, the electronic device can reset the number of detected events to zero. This can allow the electronic device to differentiate between different inputs provided by a user. Process 200 can then return to step 204 and determine whether the volume timer has passed a threshold.

If, at step 208, the electronic device instead determines that the timeout has not lapsed, process 200 can move to step 216. At step 216, the electronic device can determine whether a short event caused by an input on the primary button is detected. For example, the electronic device can determine whether a conductive path associated with an interface of the electronic device (e.g., an audio jack trace) has shorted. If the electronic device determines that a short event has been detected, process 200 can move to step 218. At step 218, the electronic device can determine whether a register for one or more secondary buttons indicated that the secondary buttons were pressed or down. For example, the electronic device can retrieve from memory a value in a register associated with a secondary button. If the electronic device determines that the register value is down or pressed, the electronic device can move to step 220. At step 220, the electronic device can change the register value to up or released. This may be necessary, for example if the electronic device cannot detect changes in state of secondary buttons while a primary button is pressed (e.g., the shorting event of the primary button prevents the electronic device from detecting the resistance or tone associated with the secondary button). The electronic device can also indicate to the main task that the secondary button value is up. Process 200 can then move to step 222.

If, at step 218, the electronic device instead determines that no register for the secondary button is down, process 200 can move to step 222. At step 222, the electronic device can record the number of primary button short events to determine the current status of the primary button. For example, the electronic device can determine whether the primary button is pressed (e.g., a circuit is shorted) or released, and how many times the primary button was pressed or released. At step 226, the electronic device can determine whether a correct number of events were detected based on the detected current status of the primary button. For example, the electronic device can determine whether an even number of events was detected if the primary button status is up or released, and whether an odd number of events was detected if the primary button status is down or pressed. If the electronic device determines that an incorrect number of short events were detected, process 200 can move to step 228. At step 228, the electronic device can reset the primary button status and release from memory the recorded number of short events (e.g., reset the number of detected events to 0). Process 200 can then return to step 204, described above. If, at step 226, the electronic device determines that the correct number of short events was detected, process 200 can move to step 230. At step 230, the electronic device can increment the number of short events detected. For example the electronic device can store in a register the number of detected short events.

In some embodiments, particular combinations of short events detected can be re-mapped to assist users in interacting with the device. For example, the electronic device can perform the same operation in response to detecting six or eight short events (e.g., triple or quadruple click are mapped to the same operation). As another example, the electronic device can perform the same operation in response to detecting five and seven short events (e.g., double click and hold and triple click and hold are mapped to the same operation). Process 200 can then return to step 204.

If, at step 216, the electronic device instead determines that no short event was detected, process 200 can move to step 232. At step 232, the electronic device can determine whether a button event from a secondary button was detected. For example, the electronic device can determine whether a tone or resistor value was detected. If no button event was detected, process 200 can return to step 204, described above. If instead a button event is detected, process 200 can move to step 234. At step 234, the electronic device can reset the status of the primary button. For example, the electronic device can set the primary button status to released or up, independent of the actual status of the primary button. For example, the electronic device can reset the register defining the number of detected short events to 0. In some embodiments, step 234 can occur after step 240 (e.g., so that non-0 registry values are used before setting the registry to 0). At step 236, the electronic device can determine whether short events were detected within the timeout duration prior to detecting the button event (e.g., a user double clicked the primary button then provided an input to change the volume). If the electronic device determines that prior short events were detected process 200 can move to step 238.

At step 238, the electronic device can determine whether an even number of prior short events was detected. For example, the electronic device can determine whether the detected prior short events ended with a release of the primary button. This may be, for example because a user cannot simultaneously provide an input that requires holding the primary button and press the secondary button. If the electronic device determines that an even number of prior short events was detected, process 200 can move to step 240. At step 240, the electronic device can provide the detected number of short events to the main task to perform the electronic device operation associated with the detected number of short events. Process 200 can then move to step 242.

If, at step 238, the electronic device determines that an odd number of prior short events was detected, or at step 236, the electronic device determines that no prior short events were detected, process 200 can move to step 242. At step 242, the electronic device can check the status of each of the secondary buttons. This may be of particular interest for a resistor-based implementations, in which some buttons can be associated with stronger resistors that hide from detection other buttons associated with weaker resistors. The electronic device can in addition notify the main task of the current status of the secondary buttons. At step 244, the electronic device can store the current time for the volume timer. The current time can then be used to determine when to ramp volume (e.g., step 206). At step 246, the electronic device can increment the volume associated with the secondary button for which a button event was detected. For example, the electronic device can increase or decrease the volume by a predetermined amount (e.g., a predetermined dB level), or to a predetermined volume level (e.g., increase or decrease to the next increment in volume when the current volume level is between two increments). Process 200 can then return to step 204.

Figure 3:
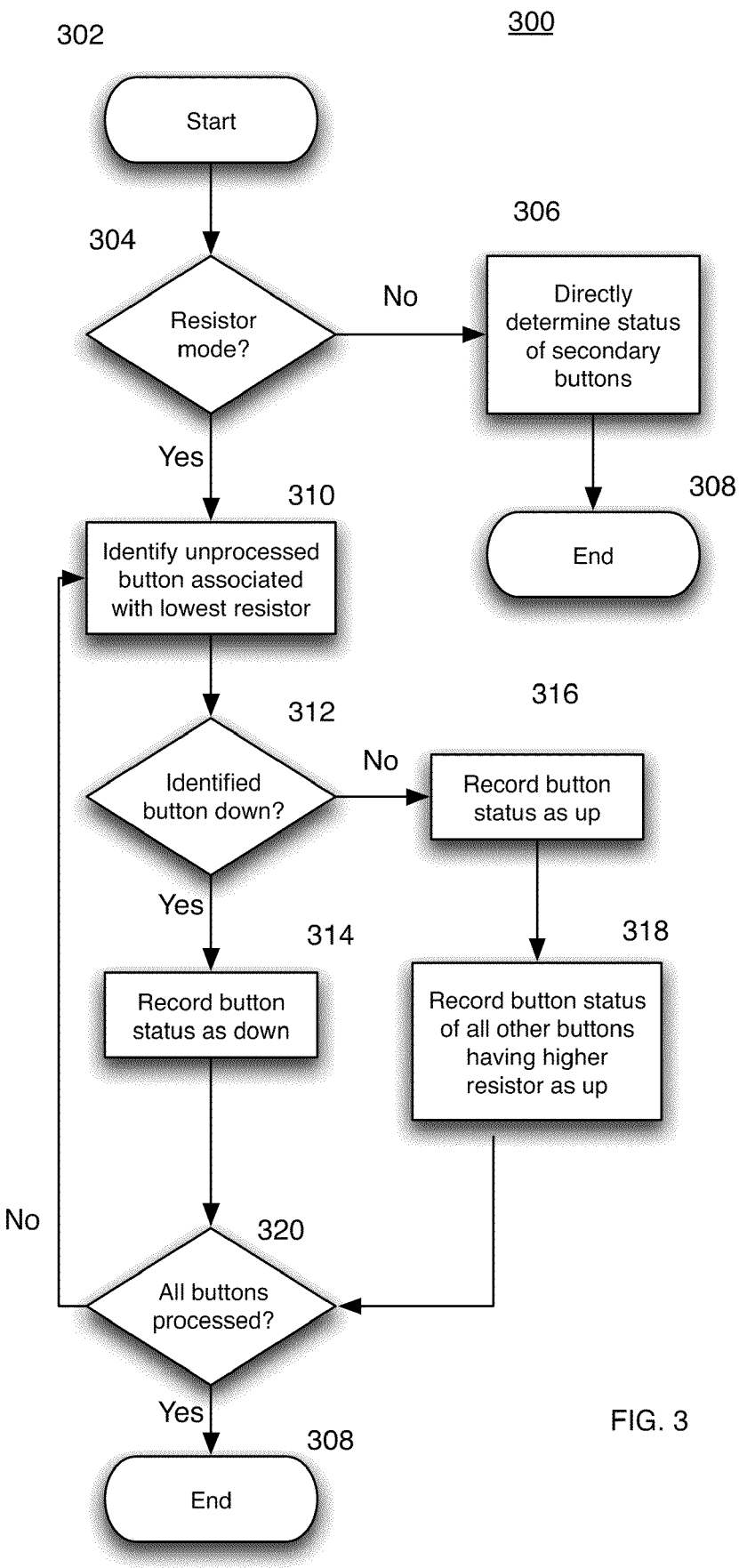
FIG. 3 is a flowchart of an illustrative process for determining the current status of a secondary button in accordance with one embodiment of the invention.

FIG. 3 is a flowchart of an illustrative process for determining the current status of a secondary button in accordance with one embodiment of the invention. In some embodiments, process 300 can be implemented as part of other processes, for example as part of step 242 of process 200 (FIG. 2). Process 300 can begin at step 302. At step 304, the electronic device can determine whether the input interface operates in a resistor mode (e.g., as opposed to a tone mode). If the electronic device determines that the interface does not operate in a resistor mode, process 300 can move to step 306. At step 306, the electronic device can directly determine the status of each of the secondary buttons (e.g., none of the tones hides another tone). Process 300 can then end at step 308.

If, at step 304, the electronic device instead determines that the interface operates in a resistor mode, process 300 can move to step 310. At step 310, the electronic device can identify the unprocessed secondary button associated with the lowest resistor (e.g., the weakest secondary button). At step 312, the electronic device can determine whether the identified button is pressed or down. For example, the electronic device can detect the resistance associated with the identified button. If the electronic device determines that the button is down, process 300 can move to step 314. At step 314, the electronic device can record the button status as down in a register associated with the identified button. Process 300 can then move to step 320.

If, at step 312, the electronic device instead determines that the identified button is not down, process 300 can move to step 316. At step 316, the electronic device can record the identified button status as up in an appropriate register. At step 318, the electronic device can record the button status of all other buttons associated with higher resistors (e.g., stronger secondary buttons) as up in the appropriate registers. The electronic device, however, will not change the recorded status of secondary buttons that are weaker than the identified secondary button. Process 300 can then move to step 320. At step 320, the electronic device can determine whether all of the secondary buttons were processed. For example, the electronic device can determine whether the status of each button was specifically identified (e.g., and not just set in a register). If the electronic device determines that all buttons were processed, process 300 can end at step 308. Alternatively, if the electronic device determines that all of the buttons were not processed, process 300 can return to step 310 and select the secondary button associated with the next lowest resistor (e.g., the next weakest button).

In some embodiments, the electronic device circuitry can verify secondary button presses prior to determining that a secondary button was actually pressed. For example, the electronic device circuitry associated with the secondary button press can detect an initial button event (e.g., a button press), reset the transmitter and receiver of the circuitry, and detect the button event a second time. This approach may prevent falsely identifying button events, which may be more easily mis-identified due to the specific range of resistance, voltage, or audio tones associated with each secondary button (e.g., as opposed to simply determining whether a circuit is shorted).

The above-described embodiments of the present invention are presented for purposes of illustration and not of limitation, and the present invention is limited only by the claims which follow.

What is claimed is:

1. A method for processing inputs from an input interface comprising at least one button that does not provide inputs from shorting an electrical circuit, comprising:
   detecting at least one of a resistor value and a tone frequency emitted as a result of a press of the at least one button;
   identifying a number of previously detected short events resulting from a press of a second button;
   storing the time at which the one of the at least one resistor value and frequency tone were detected for a volume timer; and
   incrementing the volume in response to detecting.

2. The method of claim 1, wherein identifying further comprises:
   identifying a number of previously detected short events within a timeout period.

3. The method of claim 1, further comprising:
   storing the number of detected short events in memory; and
   resetting the stored number of detected short events to zero in response to detecting.

4. The method of claim 2, further comprising:
   storing the number of detected short events in memory;
   monitoring a timeout; and
   resetting the number of detected short events in response to determining that the monitored timeout lapses.

5. The method of claim 1, further comprising:
   determining that the volume timer has exceeded a threshold; and
   ramping the volume in response to determining that the volume timer has exceeded the threshold.

6. A method for processing inputs from an input interface having a primary button and secondary buttons, the secondary buttons associated with a resistor network, comprising:
   detecting a short event from an input associated with the primary button;
   resetting register values for the secondary buttons to up;
   recording a number of short events within a timeout;

providing the recorded number of short events to a queue for processing by a user interface;
detecting a button event from a secondary button;
resetting a register value for the primary button to up;
storing the current time for a volume timer in response to detecting the button event; and
incrementing the volume of played back media based on the detected button event.

7. The method of claim 6, further comprising:
determining that the volume timer has passed a threshold; and
ramping the volume of the played back media.

8. The method of claim 6, further comprising:
resetting the number of detected short events to 0 after providing the recorded number of short events to the queue.

9. The method of claim 6, further comprising:
storing the number of detected short events in a registry.

10. The method of claim 6, wherein:
detecting the button event from the second event does not comprise detecting an electrical short event.

11. The method of claim 10, wherein detecting the button event further comprising:
detecting at least one of a particular resistivity and a particular tone.

12. The method of claim 10, further comprising:
determining a value associated with the detected button event; and
incrementing the volume up or down based on the determined value.

13. The method of claim 10, wherein the determined value is at least one of:
a resistance value; and
a tone frequency.

14. The method of claim 6, further comprising:
identifying the number of detected short events;
determining the user interface operation associated with the detected number of short events; and
perform the detected user interface operation.

15. The method of claim 6, further comprising:
determining the state of the first button; and
determining whether the number of recorded short events corresponds with the determined state of the first button.

16. An electronic device operative to receive an input from an input interface, the electronic device comprising an input interface, an output interface, and a processor, wherein:
the input interface comprises at least a first button and a second button; and
the processor is operative to:
detect a short event from an input associated with the first button;
record a number of short events within a timeout;
direct the output interface to perform an interface operation associated with the recorded number of short events;
detect a button event from a second button, wherein the detected button event does not comprise an electrical short; and
direct the output interface to increment the volume of audio output by the electronic device.

17. The electronic device of claim 16, wherein the processor is further operative to:
initiate a timer in response to detecting the button event from the second button;
determine that the initiated timer has passed a threshold; and
ramp the volume in response to determining that the timer has passed the threshold.

18. The electronic device of claim 16, wherein the processor is further operative to:
determine the current status of the first button;
determine whether the detected number of short events corresponds to the determined current status; and
reset the number of detected short events in response to determining that the detected number of short events does not correspond to the determined current status.

19. The electronic device of claim 16, wherein the processor is further operative to:
reset the first button status in response to detecting the button event from the second button.

20. The electronic device of claim 16, wherein:
the input interface comprises a plurality of second buttons; and
the processor is further operative to:
determine that the detected button event from the second button comprises at least one distinguishable resistor value, wherein each of the plurality of second buttons is associated with a distinct resistor value;
order the plurality of second buttons in order of lowest resistor value; and
verify the status of each of the plurality of second buttons in the order of lowest resistor value.

* * * * *